Patented Sept. 5, 1950

2,521,402

UNITED STATES PATENT OFFICE 2,521,402

LIQUID MEDIA FOR OPERATION OF HYDRAULIC MECHANISMS

Arthur Osborn, London, England, assignor to Standard Oil Development Company, a corporation of Delaware No Drawing. Application July 30, 1947, Serial No. 764,921. In Great Britain August 15, 1946

6 Claims. (Cl. 252—79.)

This invention relates to fluid media for operation of hydraulic mechanisms.

Heretofore it has been customary in automobile and aircraft practice to employ hydraulic means for operating control mechanisms from a remote point. In the arrangements at present in use it has been usual to employ, as a hydraulic media, oily base fluids usually composed of mixtures of various petroleum fractions or mixtures of fatty oils and alcohol.

These mixtures have the disadvantage that they are inflammable and create a risk of fire in the case of a fracture or failure of the vessels and conduits containing them, particularly whilst the aircraft or engines are in operation.

It is an object of the present invention to provide new fluid media suitable for use in hydraulic mechanisms which are non-inflammable and, therefore, eliminate this risk of fire.

Such liquids for use as media for operation of hydraulic mechanisms should have a relatively flat viscosity curve, that is, that the viscosity should not rise rapidly on reduction of temperature and the liquids should remain liquid at relatively low temperatures of the order of minus 60° F.

For general hydraulic operation it is preferred that such liquids should have a viscosity range from about 10 centistokes at 100° F., and between 500/1,000 centistokes at minus 40° F. Certain limitations are, however, imposed by the physical nature of those fluids which are the subject of this invention, and a viscosity of between 1500/2000 at minus 40° F. has been accepted.

It has now been found that liquid media highly suitable for the operation of hydraulic mechanisms, particularly under low temperature conditions as experienced in operating aircraft, which are free from danger of inflammability, may be prepared by mixing together ethylene glycol and water and adjusting the viscosity and viscosity index by the admixture of the polyoxy-alkylene derivatives of partial esters of sorbitan, sold by the Atlas Powder Company of Wilmington, Delaware, U. S. A., under the trade names 'Tween 20" and "Tween 80."

The present invention accordingly consists in a method of preparing a liquid media for hydraulic mechanisms comprising mixing together ethylene glycol and water and one or both of the polyoxy-alkylene derivatives of sorbitan monolaurate and sorbitan mono-oleate sold by the Atlas Powder Company of Wilmington, Delaware, U. S. A., under the trade names "Tween 20" and "Tween 80" respectively.

These compounds may be prepared from the sorbitan an anhydride of sorbitol by partially esterifying the same with lauric or oleic acid respectively and further reacting the free hydroxyl groups in the said partial ester with one or more molecules of alkylene oxides to yield the polyoxy-alkylene derivative.

In preparing the liquid media according to the invention the ethylene glycol and water should be in the proportion to yield together with the polyoxyalkylene derivative of the sorbitan ester a final solution which will remain liquid at temperatures down to at least minus 60° F. and suitable proportions of ethylene glycol and water are 50% to 65% by volume of the ethylene glycol and 50% to 35% by volume of water, but these may be varied within wide limits.

The proportion of the polyoxy-alkylene derivative of the sorbitan ester may range from about 5% to 40% by volume of the glycol/water mixture and should be sufficient to impart to the same the desired viscosity characteristics.

Examples of suitable liquids prepared according to this invention are:

Example I

A mixture was prepared by mixing together 49% by volume of ethylene glycol, 26% by volume of water and 25% by volume of the polyoxy-alkylene derivative of sorbitan monolaurate solid under the registered trade mark "Tween 20."

This composition was found to have the following viscosity characteristics:

| | Centistokes |
|---|---|
| Viscosity at 100° F | 12.3 |
| Viscosity at —40° F | 2168 |

Example II

The mixture was prepared by mixing together 41% by volume of ethylene glycol, 34% by volume of water, 25% of the polyoxy-alkylene derivative of sorbitan monolaurate sold under the registered trade mark "Tween 20."

This composition was found to have the following viscosity characteristics:

| | Centistokes |
|---|---|
| Viscosity at 100° F | 11.72 |
| Viscosity at —40° F | 1550 |

Example III

A mixture was prepared by mixing together 44 parts by volume of ethylene glycol, 36 parts by volume of water and 20 parts by volume of the polyoxy-alkylene derivative of sorbitan monooleate solid under the registered trade-mark "Tween 80."

This mixture was found to have the following viscosity characteristics:

| | Centistokes |
|---|---|
| Viscosity at 100° F | 8.84 |
| Viscosity at −40° F | 1487 |

*Example IV*

A mixture was prepared by mixing together 48 parts by volume of ethylene glycol, 32 parts by volume of water and 20 parts by volume of the polyoxy-alkylene derivative of sorbitan monooleate sold under the registered trade-mark "Tween 80." This composition was found to have the following viscosity characteristics:

| | Centistokes |
|---|---|
| Viscosity at 100° F | 8.70 |
| Viscosity at −40° F | 908 |

All the above mixtures remained fluid at −65° F. and boiled between 230 and 240° F. and did not ignite even at the boiling point.

*Example V*

A mixture was prepared by mixing together 43 parts by volume of ethylene glycol, 35 parts by volume of water and 12 parts by volume of the polyoxy-alkylene derivative of sorbitan monolaurate sold under the registered trade-mark "Tween 20" and 10 parts by volume of the polyoxy-alkylene derivative of sorbitan mono-oleate sold under the registered trade-mark "Tween 80."

This composition was found to have the following viscosity characteristics:

| | Centistokes |
|---|---|
| Viscosity at 100° F | 10.1 |
| Viscosity at −40° F | 1520 |

Other substances such as corrosion-preventing compounds, anti-foaming agents and lubricants may also be added to the mixture.

It is found in practice that compositions prepared in accordance with this invention have better lubricating properties than the non-inflammable liquids previously used as the medium for operating hydraulic mechanism and their use in such mechanisms reduces considerably the wear on working parts of the mechanisms.

What I claim is:

1. A non-inflammable liquid composition of matter freezing below −60° F. and especially suited for use in hydraulic mechanisms which consists of a mixture of from 50 percent to 65 percent by volume of ethylene glycol and 50 percent to 35 percent by volume of water with from 5 percent to 40 percent by volume, based on the glycol/water mixture, of a polyoxyalkylene derivative of a compound selected from the group consisting of sorbitan monolaurate and sorbitan monooleate as a viscosity increasing agent at 100° F. and mixtures thereof.

2. A composition of matter especially suited for use in hydraulic mechanisms which consists essentially of from 50 percent to 65 percent by volume of ethylene glycol and from 50 percent to 35 percent by volume of water with respect to a mixture of the ethylene glycol and water, and a polyoxyalkylene derivative of sorbitan monolaurate as a viscosity increasing agent at 100° F. admixed therewith in a proportion of 5 percent to 40 percent by volume of said mixture.

3. A composition of matter especially suited for use in hydraulic mechanisms which consists essentially of a mixture of from 50 percent to 65 percent by volume of ethylene glycol and from 50 percent to 35 percent by volume of water with from 5 percent to 40 percent by volume of the glycol/water mixture of a polyoxyalkylene derivative of sorbitan monooleate as a viscosity increasing agent at 100° F.

4. A composition of matter comprising 49 percent by volume of ethylene glycol, 26 percent by volume of water and 25 percent by volume of a polyoxyalkylene derivative of sorbitan monolaurate as a viscosity increasing agent at 100° F.

5. A composition of matter comprising 44 percent by volume of ethylene glycol, 36 percent by volume of water and 20 percent by volume of a polyoxyalkylene derivative of sorbitan monooleate as a viscosity increasing agent at 100° F.

6. A composition of matter comprising 43 percent by volume of ethylene glycol, 35 percent by volume of water, 12 percent by volume of the polyoxyalkylene derivative of sorbitan monolaurate and 10 percent by volume of a polyoxyalkylene derivative of sorbitan monooleate as a viscosity increasing agent at 100° F.

ARTHUR OSBORN.

REFERENCES CITED

The following references are of record in the file of this patent:

UNITED STATES PATENTS

| Number | Name | Date |
|---|---|---|
| 1,898,564 | Muench et al. | Feb. 21, 1933 |
| 1,928,956 | Tatter | Oct. 3, 1933 |

OTHER REFERENCES

"Atlas Spans and Atlas Tweens," publication by the Atlas Powder Co., Wilmington, Del. Reprinted June 1945.

"Atlas Spans and Atlas Tweens," publication by the Atlas Powder Co., Wilmington, Del. Revised Dec. 1943.